Aug. 22, 1961  D. D. SMOUT  2,997,571
ELECTRIC ARC WELDING
Filed June 15, 1959  3 Sheets-Sheet 1
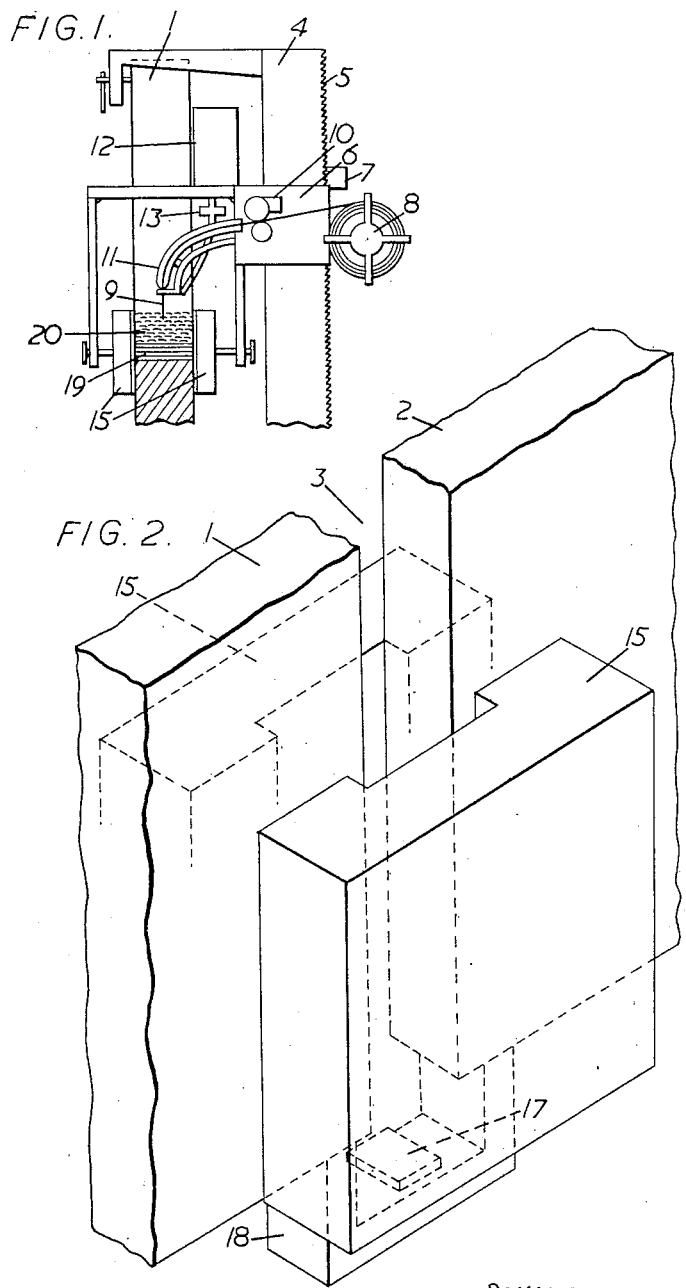
Inventor
DONALD DUPREE SMOUT
By
Aaron R. Townshend Attorney

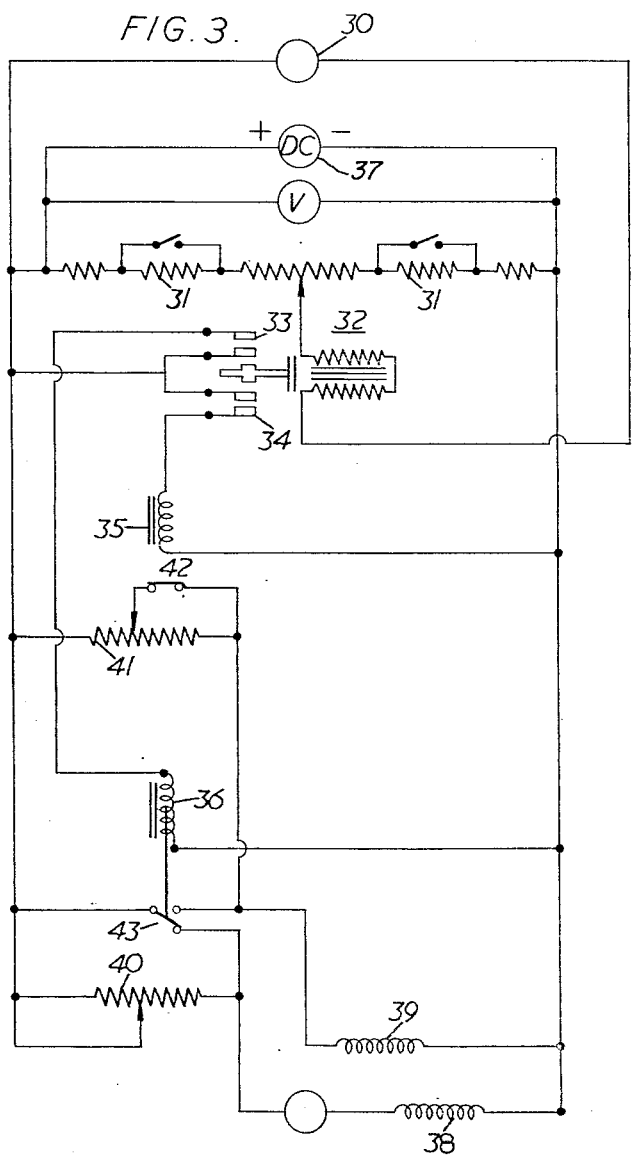

Aug. 22, 1961     D. D. SMOUT     2,997,571
ELECTRIC ARC WELDING
Filed June 15, 1959     3 Sheets-Sheet 3
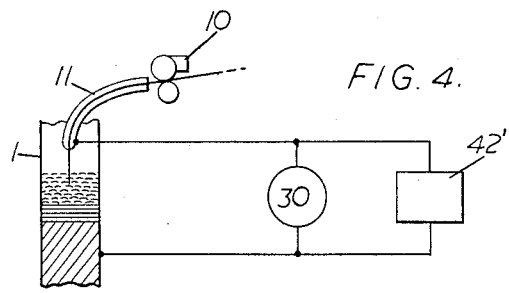
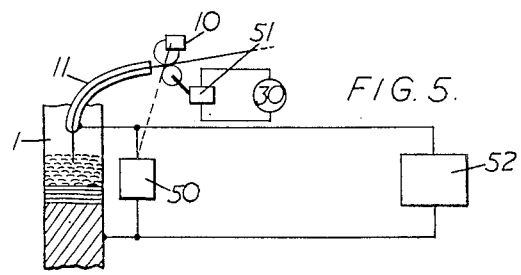
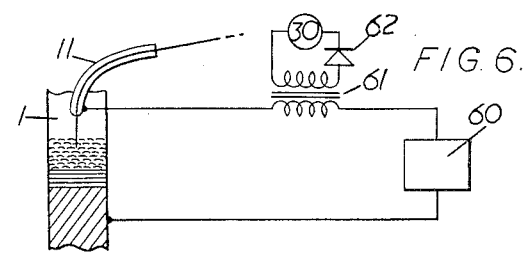
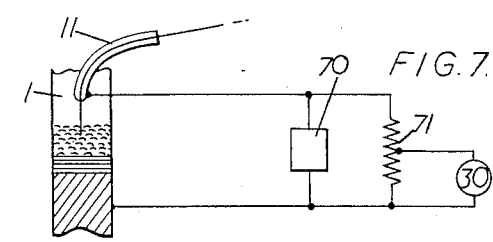
Inventor
DONALD DUPREE SMOUT
By
Aaron R. Townshend, Attorney

United States Patent Office 2,997,571
Patented Aug. 22, 1961

2,997,571
ELECTRIC ARC WELDING
Donald D. Smout, Jesmond, Newcastle-upon-Tyne, England, assignor to The British Oxygen Company Limited, a British company
Filed June 15, 1959, Ser. No. 820,521
Claims priority, application Great Britain June 16, 1958
13 Claims. (Cl. 219—126)

This invention relates to electric arc welding and more particularly to methods and apparatus by means of which metal can be deposited at relatively high rates from a consumable electrode wire.

In vertical welding with an automatic arc welding machine, it is necessary to raise the welding head in conformity with the rising surface of the weld deposit. Control of the spacing between the surface of the weld deposit and the member by which welding current is fed to the electrode wire is necessary to prevent damage to this member due to its approaching the arc zone too closely.

Further, if an arc be struck between the tip of a moving consumable electrode and a metal surface, and the position of the arcing point is maintained at the initial point of the arc initiation without lateral movement across or along the metal surface the only possible movement being vertically upwards and away from the surface, the arcing characteristic may become erratic and relatively unstable. If however the arc is struck, under similar conditions as above, but submerged under a suitable welding composition, a bath of highly fluid molten slag may be formed which within 30 seconds or more of arc initiation becomes conductive to the passage of welding current and tends to stabilize the arcing characteristic. The slag bath depth need not be much greater than 3 inches and will not generally be much less than 1½ inches.

We have discovered that once the slag bath has been formed and stable welding conditions attained, the resulting voltage drop between the current contact member and the workpiece can then be utilized for regulating the rate of vertical movement of an automatic arc welding head where it becomes necessary to raise the welding head in conformity with the rising surface of the fluid slag bath and weld deposit. Other physical factors than this voltage drop which vary with the burn-off rate of the electrode can be used to provide this regulation. Thus the electrode feed speed and welding current can be used in certain cases.

According to the present invention, in a method for depositing weld metal in a generally vertical seam from a consumable electrode fed downwardly into the seam past a welding current contact member which is raised progressively during the welding operation, the deposited weld metal being supported in the seam until it has solidified and being covered by a pool of molten slag, control of the spacing between the surface of the deposited weld metal and the welding current contact member is effected by maintaining a reasonably constant arc length or distance between the electrode tip and the upper surface of the deposited weld metal beneath a bath of molten slag, by using a welding current density in the electrode which in conjunction with the distance of the welding current contact member along the electrode from the electrode tip results in an appreciable variation in the electrode burn-off rate due to electrical resistance heating of the welding electrode during the welding operation if the spacing of the welding current contact member from the upper surface of the deposited weld metal varies from a predetermined value, and by controlling the speed at which the welding current contact member is raised in accordance with a physical factor that varies with the burn-off rate of the electrode.

It will be appreciated that the seam to be welded need not be truly vertical. Thus a generally upright seam in a large diameter sphere could be welded by the method of the invention.

The physical factor may be the voltage between the welding current contact member and the workpieces.

Alternatively the physical factor may be the electrode feed speed where this speed is varied to maintain a reasonably constant arc length.

As a further alternative the physical factor may be the welding current where the electrode feed speed is kept constant.

In performing the method it is necessary to support the weld deposit in the seam until it has solidified and to support the molten slag bath, and preferably sliding shoes are used for this purpose.

According to another aspect of the present invention, apparatus for carrying out the method described above includes means for raising the welding current contact member and moving it along the seam, and means for controlling, in accordance with a physical factor which varies with the burn-off rate of the electrode, the speed at which the member is raised.

The welding current contact member may form part of a welding head, and sliding shoes supporting the weld deposit in the weld seam may be movable with the welding head.

One construction of welding apparatus in accordance with the present invention and particularly for welding a vertical seam between two flat metal plates set up in the same vertical plane will now be described by way of example with reference to the accompanying diagrammatic drawings in which:

FIG. 1 is a sectional elevation taken through the partly welded vertical seam in the direction of one of the plates and showing the welding apparatus in use;

FIG. 2 is a perspective view of the lower part of the vertical seam before welding showing a suitable starting arrangement and one of the two sliding shoes which during welding are arranged to support molten deposited weld metal and a covering bath of molten slag in the vertical seam;

FIG. 3 is a diagram of one electrical circuit which may be used to control the raising of certain parts of the welding apparatus during welding.

FIGS. 4, 5, 6 and 7 show different methods of obtaining a control voltage to operate the electrical circuit shown in FIG. 3. The control voltage is derived in FIG. 4 from the arc voltage; in FIG. 5 in dependence upon the electrode feed speed; in FIG. 6 from an alternating welding current, and in FIG. 7 from a direct welding current.

Referring now to FIGS. 1 and 2 of the drawings, the flat metal plates 1 and 2 to be welded together are set up in the same vertical plane with a gap between their adjacent edges constituting the vertical seam 3 to be welded. A gap distance of one inch is suitable for plates of one inch thickness. Mounted parallel to the plates 1 and 2 is a pillar 4 incorporating a rack 5. A welding head 6 is supported for vertical movement on the pillar 4 and includes a variable speed motor 7 which is arranged to drive a pinion (not shown) meshing with the rack 5 when the welding head 6 has to be raised. The control of this motor will be described in detail below.

The welding head 6 includes a storage reel 8 for consumable electrode wire 9, a feed motor 10 for this electrode wire, a welding current contact member 11, and a hopper 12 and metering device 13. Also movable with the welding head 6 is a pair of support members 15 of copper, each arranged to be cooled by a flow of cooling water, which bridge the gap on each side of the seam 3 and are urged against the plates 1 and 2. These support members constitute sliding shoes movable with the welding current contact member 11, and are rebated as shown in FIG. 2 to mould the vertical surfaces of the deposited weld metal to a required contour (bearing in mind that a thin skin of slag extends between each support member and the deposited weld metal during welding).

Welding may be commenced by establishing an electric arc between the tip of the electrode wire 9 and a metal striking block 17 disposed in a copper trough 18 having the same thickness as the plates 1 and 2 and defining a recess of larger cross-section than the seam 3, the sides of the trough being closed by the support members 15. The electrode wire 9 is fed forward by the feed motor 10, straightened, and then directed downwardly and parallel to the seam 3 by the nozzle of the welding current contact member 11. As weld metal 19 is deposited in the trough 18, a welding composition consisting of powdered or granulated slag-forming minerals is fed to the welding zone. This welding composition may be of the type used in submerged melt welding fluxes and so may include alloying ingredients where desirable.

A bath of molten slag 20 confined by the support members 15 and the inner walls of the trough then builds up above the deposited weld metal and the electric arc, and the motor 7 is then energised to raise the welding head 6 at suitable speed. By the time that the surface of the deposited weld metal has reached the seam 3, the welding conditions have stabilised and the edges of the plates 1 and 2 in the vicinity of the welding zone have been preheated by heat flowing from this zone to assist adequate weld metal fusion into the plates. On completion of the weld the trough 18 may be removed and used on subsequent seams.

During welding of the seam 3, the upper surface of the deposited weld metal rises at a rate determined by the rate at which weld metal is deposited and the cross-sectional area of the seam. Accordingly the welding head 6 is raised progressively by the motor 7 at a speed that allows solidification of the deposited weld metal whilst still supported by the support members 15. A suitable slag bath depth is maintained by periodically allowing a small quantity, say 60 grams, of welding composition to flow from the hopper 12 to the slag bath by way of the metering device 13. When welding composition is required and a small container in the metering device 13 has been filled, the hopper device orifice is closed and the outlet of the small container is opened, under solenoid control, to deliver its contents to the slag bath.

As in the automatic arc welding of horizontal seams it is necessary to maintain a reasonably constant arc length on distance between the tip of the electrode wire and the upper surface of weld metal. In accordance with the present invention, however, there is provided a second control for controlling the speed at which the welding head 6, including the welding current contact member 11, is raised by the variable speed motor 7. This control prevents damage of the welding current contact member 11 due to this member getting too close to the welding zone, and ensures constant conditions of heat input into the plates being welded which is important to obtain uniform welding results. The basis of this control is the dependence of the burn-off rate of the electrode wire 9 on the resistance heating effect of the welding current in the electrode wire. This heating effect becomes appreciable and therefore useful as a basis for this second control when high welding current densities (in excess of 40,000 amperes per square inch say) in the electrode are used.

In a first welding control system in accordance with the invention, the electrical circuit of which is shown in FIGS. 3 and 4 and the apparatus of which is shown in FIG. 1, the electrode wire 9 is supplied at a constant electrode feed speed with an electrode extension of approximately 3 inches, and welding current is supplied from a power source 42' having a drooping volt-ampere characteristic, the welding current falling by 90 amperes for a voltage increase from 45 to 55 volts for example. Thus the arc length or distance between the electrode tip and the upper surface of the deposited weld metal is maintained reasonably constant. The variable speed motor 7 is arranged to raise the welding head 6 at a speed which is controlled by variations of the voltage between the welding current contact member 11 and the plates 1 and 2 so as to maintain a sensibly constant voltage between the member and the plates.

Specifically referring to FIGS. 3 and 4, it will be seen that a control voltage 30, which in this case is the arc voltage or voltage between the welding current contact member 11 and the plates 1 and 2, is applied through resistors 31 to the coil of a polarised relay 32. Variation of this voltage from a predetermined value causes closure of one or other of two pairs of contacts 33 and 34. Closure of contacts 33 or 34 respectively allows energisation of relay 35 or 36 from a source 37 that provides a reference voltage with which the control voltage 30 is compared. The variable speed motor 7 has a series winding 38 and shunt winding 39 which are arranged to be connected to the voltage source 37 respectively through a series resistor 40 or a shunt resistor 41. It will be seen that relay 35 controls contacts 42 which are arranged to short circuit a section of the shunt resistor 41 when closed, and that relay 36 controls contacts 43 which either short-circuit the whole of shunt resistor 41 and connect the series resistor 40 in series with the series winding 38 or short-circuit the series resistor 40 and connect the shunt resistor 41 in series with the shunt winding 39.

In operation of this first system, the control voltage 30 is provided by an arc voltage or voltage between the welding current contact member 11 and plates 1 and 2 in the range 43 to 50 volts. This voltage is compared with the reference voltage, and polarised relay 32 effects connection of the series resistor 40 and shunt resistor 41 so that the motor 7, although continuously energised during deposition of weld metal in the seam 3, is energised at different rates to raise the welding head 6 at a higher speed when the control voltage falls below a predetermined value to the lower end of the range and at a lower speed when this rises to the higher end of the range.

In this system, if the rate of vertical movement of the welding current contact member 11 does not keep pace with the rate of vertical movement of the upper surface of the weld deposit then the electrode extension will decrease since the art length or distance between the electrode tip and this surface of the weld deposit remains constant. This leads to a reduction in the burn-off rate of the electrode wire 9 due to the resistance heating effect and hence to an increase in the welding current in order to match the burn-off rate with the wire feed speed. This increase in welding current must also be matched by a decrease in arc voltage as determined by the volt-ampere characteristic of the power source. The decrease in arc voltage is used to effect an increase of speed of the welding current contact member to maintain welding conditions stable.

Using this system of control the following welding conditions have been used for vertical welding 1 inch thick boiler quality mild steel plate.

Welding current—500 amperes A.C.
Arc voltage—45 volts
Welding head vertical travel speed—1.3 inch per minute
Wire diameter—⅛ inch
Electrode extension—3 inches approximately
Slag bath depth—2½ inches approximately
Electrode feed rate—126 inches per minute In a second welding control system in accordance with the invention, shown diagrammatically in FIGS. 3 and 5, a constant arc length is maintained by varying the electrode wire feed speed. In this case the speed of the electrode feed motor 10 is varied by means of a relay 50 energised on the occurrence of variations of the arc voltage or voltage between the electrode wire 9 and plates 1 and 2. The vertical movement of the welding head is then controlled in inverse proportion to the electrode wire feed speed, a tachometer generator 51 driven by the electrode feed motor 10 generating a control voltage 30 which is applied to the circuit of FIG. 1. Welding current is supplied by a source 52.

In a third welding control system in accordance with the invention, shown diagrammatically in FIGS. 3 and 6 and FIGS. 3 and 7 the electrode feed speed is maintained constant and the rate of vertical movement of the welding head is controlled in accordance with variation of the magnitude of the welding current once normal welding conditions have been established. In FIG. 6, the welding current is supplied from a source 60 of alternating current, and a control voltage 30 is to be applied to the circuit of FIG. 3 is derived from the welding current by way of a transformer 61 and a rectifier 62. In FIG. 7 welding current is supplied from a source 70 of direct current and a control voltage 30 to be applied to the circuit of FIG. 3 is derived from a shunt resistor 71.

I claim:

1. In a method of depositing weld metal in a generally vertical seam which comprises feeding a consumable electrode downwardly into the seam past a welding current contact member to deposit weld metal beneath a bath of molten slag having a depth of from 1½ to 3 inches, raising the welding current contact member progressively as the weld metal rises in the vertical seam, and maintaining a reasonably constant distance between the electrode tip and the welding current contact member by variation of at least one of the three physical factors that determine the burn-off rate of the consumable electrode, namely the electrode feed speed, the welding current, and the voltage between the welding current contact member and the workpiece, the improvement which consists in controlling the spacing of the welding current contact member from the upper surface of the deposited weld metal by controlling the raising of the welding current contact member in accordance with the variation of one of said three physical factors when the spacing of the welding current contact member from the upper surface of the deposited weld metal varies from a predetermined value.

2. A method of depositing weld metal in accordance with claim 1, characterised in that the welding current density in the consumable electrode is in excess of 40,000 amperes per square inch.

3. Apparatus for depositing weld metal in a generally vertical seam comprising electrode feed means for feeding a consumable electrode downwardly into the seam to deposit weld metal below a bath of molten slag, means for supporting the molten slag bath and unsolidified weld metal in the seam, a welding current contact member arranged to conduct welding current to said consumable electrode, means for maintaining a reasonably constant distance between the electrode tip and the welding current contact member by variation of at least one of the three factors that determine the burn-off rate of the consumable electrode, namely the electrode feed speed, the welding current, and the voltage between the welding current contact member and the workpiece, means for raising the welding current contact member progressively during the welding operation in relation to the workpiece being welded, and means controlling the speed at which the welding current contact member is raised, said means being responsive to variation of one of said three factors when the spacing of the welding current contact member from the upper surface of the deposited weld metal varies from a predetermined value.

4. Apparatus for depositing weld metal in a generally vertical seam comprising electrode feed means for feeding a consumable electrode downwardly into the seam at substantially constant speed to deposit weld metal beneath a bath of molten slag, a source of welding current having a drooping volt-ampere characteristic, a welding current contact member arranged to conduct welding curruent from said source to said consumable electrode, said electrode feed means and said source of welding curruent being adapted to maintain a reasonably constant distance between the electrode tip and the upper surface of the deposited weld metal, means for raising the welding current contact member progressively during the welding operation in relation to the workpiece being welded, and means responsive to the voltage between the welding current contact member and the workpiece for controlling the speed at which the welding current contact member is raised.

5. Apparatus for depositing weld metal in a generally vertical seam comprising electrode feed means for feeding a consumable electrode downwardly into the seam at substantially constant speed to deposit weld metal beneath a bath of molten slag, means for supporting the molten slag bath and unsolidified weld metal in the seam, a source of welding current, a welding current contact member arranged to conduct welding current from said source to said consumable electrode, said electrode feed means and said source of welding current being adapted to maintain a reasonably constant distance between the electrode tip and the upper surface of the deposited weld metal, means for raising the welding current contact member progressively during the welding operation in relation to the workpiece being welded, and means responsive to the welding current for controlling the speed at which the welding current contact member is raised.

6. Apparatus for depositing weld metal in a generally vertical seam comprising electrode feed means for feeding a consumable electrode downwardly into the seam to deposit weld metal below a bath of molten slag, means for supporting the molten slag bath and unsolidified weld metal in the seam, a welding current contact member arranged to conduct welding current to said consumable electrode, means responsive to the voltage between the welding current contact member and the workpiece for varying the electrode feed speed to maintain a reasonably constant distance between the electrode tip and the upper surface of the deposited weld metal, means for raising the welding current contact member progressively during the welding operation in relation to the workpiece being welded, and means responsive to the electrode feed speed for controlling the speed at which the welding current contact member is raised.

7. A method of depositing weld metal in accordance with claim 1, wherein the physical factor is the voltage between the welding current contact member and the workpieces being welded.

8. A method of depositing weld metal in accordance with claim 1, wherein the physical factor is the electrode feed speed and this speed is varied to maintain a reasonably constant arc length.

9. A method of depositing weld metal in accordance with claim 1, wherein the electrode feed speed is kept constant and the physical factor is the magnitude of the welding current.

10. A method of depositing weld metal in accordance with claim 1, wherein support means for the molten deposited weld metal and the bath of molten slag are raised progressively during the welding operation.

11. A method of depositing weld metal in accordance with claim 1, wherein during the welding operation, slag forming material is supplied to the bath of molten slag in small measured quantities.

12. A method of depositing weld metal in accordance with claim 10, wherein the welding current contact member and the support means are raised by means of an electric motor which is continuously energized during the deposition of weld metal in the seam and is controlled in accordance with the physical factor.

13. Apparatus in accordance with claim 3, and including a polarised relay to which is arranged to be applied a voltage proportional to the voltage between the welding current contact member and the workpieces being welded, an electric motor arranged to raise the welding current contact member progressively during the welding operation, the polarised relay effecting energisation of the electric motor at a higher rate when this voltage falls below a predetermined value and at a lower rate when this voltage rises above this value.

References Cited in the file of this patent

UNITED STATES PATENTS

| | | |
|---|---|---|
| 1,915,981 | Davis | June 27, 1933 |
| 2,173,446 | Heindlhofer | Sept. 19, 1939 |
| 2,191,478 | Hopkins | Feb. 27, 1940 |
| 2,873,402 | Needham | Feb. 10, 1959 |
| 2,945,116 | Mosny et al. | July 12, 1960 |
| 2,969,454 | Lucey | Jan. 24, 1961 |